United States Patent [19]

Sullivan

[11] Patent Number: 5,071,216
[45] Date of Patent: Dec. 10, 1991

[54] OPTICAL INTERCONNECT WAVEGUIDE-BEAM COUPLER

[75] Inventor: Charles T. Sullivan, Burnsville, Minn.
[73] Assignee: Honeywell Inc., Minneapolis, Minn.
[21] Appl. No.: 545,442
[22] Filed: Jun. 28, 1990
[51] Int. Cl.$^5$ ............................................. G02B 6/32
[52] U.S. Cl. ...................................................... 385/34
[58] Field of Search ............... 350/96.15, 96.18, 96.20, 350/96.21

[56] References Cited

U.S. PATENT DOCUMENTS

| | | | |
|---|---|---|---|
| 4,156,206 | 5/1979 | Comerford et al. | 350/96.15 |
| 4,752,108 | 6/1988 | Vollmer | 350/96.12 |
| 4,830,454 | 5/1989 | Karstensen | 350/96.15 |
| 4,848,882 | 7/1989 | Suzuki et al. | 350/96.18 X |
| 4,865,409 | 9/1989 | Althaus et al. | 350/96.15 X |
| 4,875,750 | 10/1989 | Spaeth et al. | 350/96.15 X |

FOREIGN PATENT DOCUMENTS 0262005 11/1987 Japan ................................. 350/96.18
0224709 9/1989 Japan ................................. 350/96.18

OTHER PUBLICATIONS

Beam Coupling to Linear Waveguides Using Lenslike Waveguides, R. K. Winn & J. H. Harris, May 1975-Applied Optics.
Lens Coupling in Fiber-Optic Devices-A. Nicia, Sept. 1981, Applied Optics.

Primary Examiner—Akm Ullah
Attorney, Agent, or Firm—Edmund P. Anderson; Gregory A. Bruns

[57] ABSTRACT

An optical interconnect for coupling a collimated free space light beam to a raised channel waveguide formed on a substrate. A modified graded index rod lens has a flattened polished surface parallel to its optical axis. The rod lens is positioned with the flattened surface adjacent the substrate and an endface spaced from the waveguide endface so that a collimated light beam entering the lens will be focused onto the waveguide endface.

23 Claims, 7 Drawing Sheets

OPTICAL INTERCONNECT WAVEGUIDE-BEAM COUPLER

BACKGROUND OF THE INVENTION

The Government has rights in this invention pursuant to Contract No. N66001-87-C-0205, awarded by the Department of the Navy.

The present invention relates generally to devices for coupling a collimated light beam into an optical waveguide and specifically into a rectangular raised channel waveguide formed on a substrate.

Various coupling methods for cylindrical optical devices are known. Coupling into optical fiber having cylindrical symmetry for single mode allows the alignment to an optical axis related to the circumference or physical shape of the optical fiber. Applicant's invention is directed to a different need. The need that applicant's invention addresses is the multimode coupling of a collimated free space beam to an optical waveguide that does not have cylindrical symmetry, but rather has rectangular symmetry.

An approach to this problem in the past has been to cleave or polish both the end of the waveguide structure and the media it is to couple to and then physically position o butt couple the waveguide to the media. Butt coupling has a high degree of sensitivity to transverse or lateral misalignment. In addition it requires labor intensive and therefore expensive machining of the waveguide endface or other optical element that is to be coupled.

Thus a need exists for a device which couples a collimated free space light beam to a rectangular raised channel waveguide on a surface and does not require machining of the surface or complicated alignment methods.

SUMMARY OF THE INVENTION

The present invention solves these and other needs by providing a device that transforms a collimated light beam propagating parallel to a surface onto the endface of a raised channel waveguide on the surface. Since this process is reciprocal, the description and discussion herein pertains to both waveguide input coupling, i.e., beam-to-waveguide and waveguide output coupling, i.e., waveguide-to-beam. Except for the increased alignment precision required for single-mode channels, this approach can be used for single-mode or multimode waveguides, although multimode waveguides are preferred in most optical interconnection applications because of increased tolerance to misalignment which improves coupling efficiency.

Specifically a raised channel waveguide is formed on a substrate. A graded index rod lens is modified to have a flattened surface parallel to its optical axis. A predetermined length of the lens is located on the substrate a predetermined distance from the waveguide endface. A collimated light beam traveling parallel to the substrate and the lens optical axis will enter the lens and will be focused by the lens onto the waveguide endface.

DESCRIPTION OF THE DRAWINGS

The illustrative embodiments may best be described by reference to the accompanying drawings where:

FIGS. 9A–10 show a device for coupling a free-space light beam to a plurality of channel waveguide on a substrate.

DESCRIPTION

Figure 1:
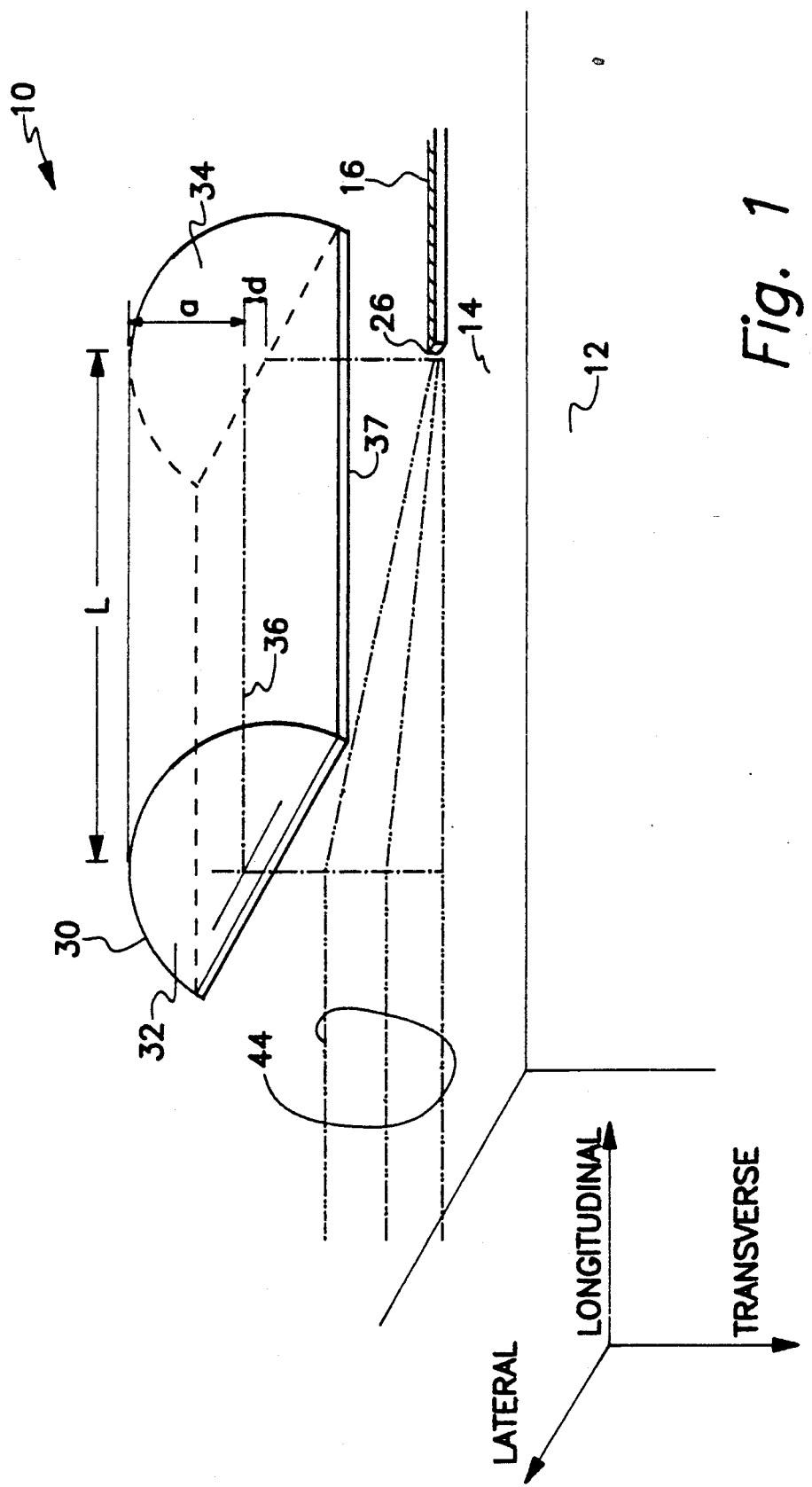
FIG. 1 shows a perspective view of a device for coupling a free space light beam to a raised channel waveguide formed on a substrate. The modified rod lens is exploded away to more clearly show details.

A device for optically interconnecting a free space light beam to an optical channel waveguide according to the teaching of the present invention is shown in the Figures and generally designated 10.

Device 10 according to the teachings of the present invention includes a substrate 12 having a reflective surface 14.

Raised channel waveguide 16 is formed on substrate 12. Waveguide 16 includes a waveguide core 18 and a waveguide clad or buffer 20. Core 18 has a thickness t. Waveguide clad 20 has a thickness b. Waveguide 16 also includes waveguide endface 26 and apparent optical axis 22.

A waveguide substrate 12 of aluminum may be used. Raised channel waveguide 16 may be formed with polymeric materials such as the polyimides and includes endface 26. Waveguide thicknesses t range from a few micrometers to about 50 micrometers. The lower waveguide clad 20 is located immediately below waveguide core 18 and has a thickness b in the range of 2–8 micrometers.

Device 10 further includes a half cylinder graded index rod lens 30 which will be referred to as HGRL 30. HGRL 30 is a modified, cylindrical, graded index o GRIN rod lens which is commercially available. A common form of GRIN rod lens media is available under the trade name SELFOC. HGRL 30 includes endface 32 and endface 34, optical axis 36 and flattened surface 37. The distance from optical axis 36 to flattened surface 37 is d. The radius of the unmodified GRIN rod lens is designated a.

In FIG. 1 a lateral axis, a longitudinal axis and a transverse axis have been shown to aid in explaining the invention.

To properly locate or position HGRL 30 on substrate 12, lateral alignment stops 38 and longitudinal alignment stops 40 are used. After HGRL 30 has been properly aligned relative to waveguide endface 26, then HGRL 30 is held securely to substrate 12 by adhesive 42 which has a thickness W.

The distance from endface 34 of HGRL 30 and endface 26 of raised channel waveguide 16 is designated c.

Now that the basic construction of device 10 has been set forth, certain additional information according to the teachings of the present invention may be explained.

It is characteristic of a GRIN lens such as SELFOC that the refractive index distribution across a circular diagonal is parabolic, with the highest index on the optical axis which coincides with the geometric axis. The refractive index decreases toward the periphery of the GRIN lens. Consequently any light ray incident on an entering face of a GRIN lens will travel sinusoidally along the lens about the optical axis. The length of the GRIN lens determines the angle at which the light ray exits the lens, so convergent, divergent or collimating functions can be obtained.

The pitch length L of a SELFOC for coupling between a collimated beam and a waveguide may be chosen as $L=0.23 P$ where L is the length of the SELFOC and P is the period of the sinusoidal trajectory a light ray 44 follows in the SELFOC. This gives a focused spot a distance c in FIG. 2 beyond lens face 34 where the waveguide endface 26 is positioned. For practical purposes, $L=0.25 P$ is equivalent to $L=(0.25+0.5 n)P$, where n is any integer. A lens of pitch $L=0.25 P$ will focus a spot on the lens exit face itself, i.e., $c=0$ in FIG. 2, when a collimated beam is incident on its entrance face. Both endfaces 32 and 34 of HGRL 30 can be planar and parallel to one another or one face can be shaped into a convex surface for increased numerical aperture and reduced spherical aberration. Antireflection coatings are usually used on each end of the SELFOC to reduce Fresnel reflection which otherwise increases insertion loss and decreases return loss.

Figure 3:
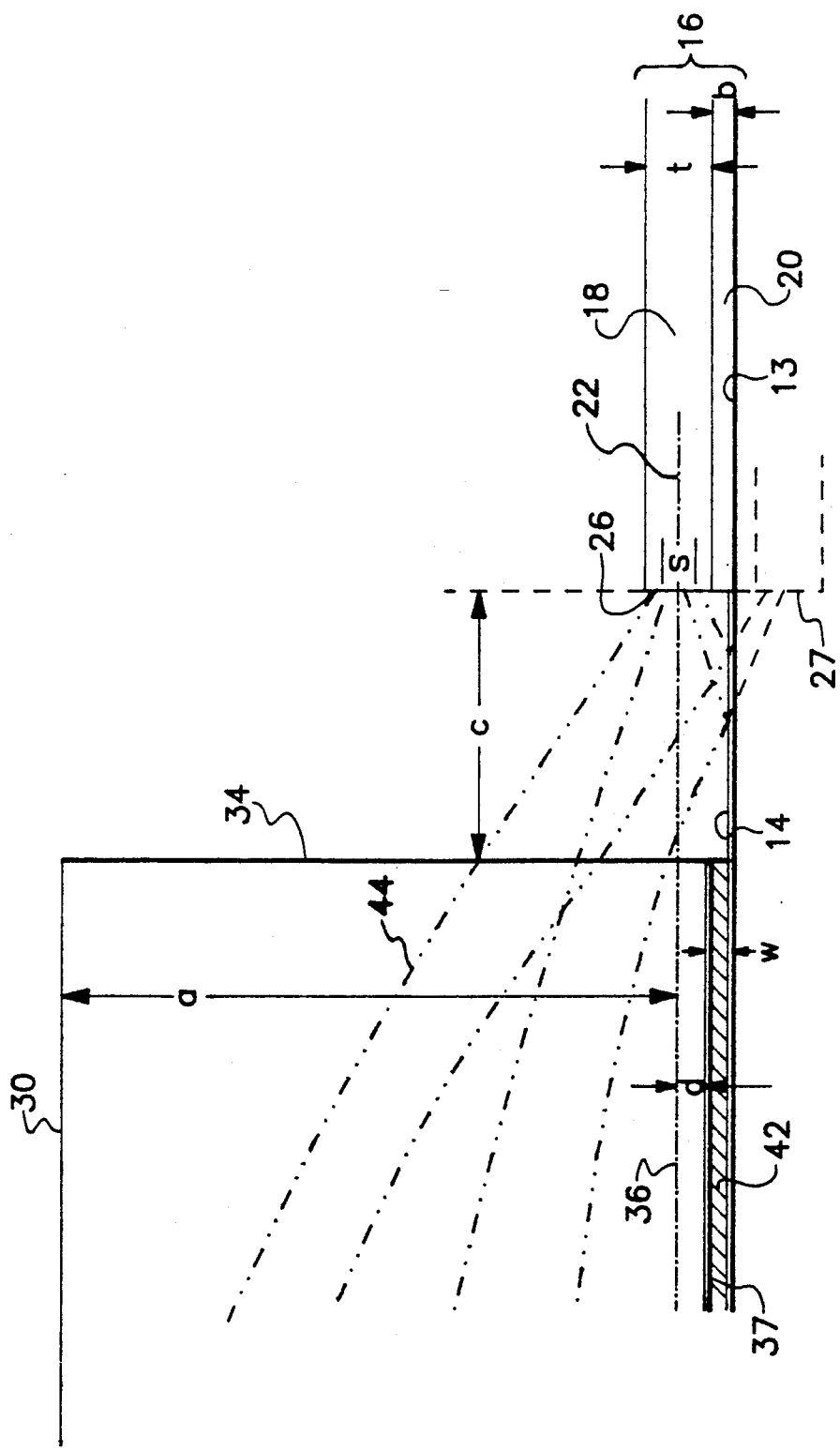
FIG. 3 shows an elevation view of the device of FIG. 1.

HGRL 30 is formed by the straight forward lapping and polishing of a SELFOC or other form of GRIN rod lens; since this process is rather time-consuming, many lenses are typically lapped and polished simultaneously as is commonly done in standard optical lens fabrication. As shown in FIG. 1 and with better detail in FIG. 3, the lapping and polishing removes material of total thickness "a" minus "d", where d is defined as the distance of this surface from the optical axis, and $d<<a$. Distance d is chosen from considerations of the cross-sectional dimensions of waveguide 16 with respect to the lens optical axis 36 as shown in FIG. 3 and from aberration considerations. The value of d permits the optical axis 36 of the lens to coincide with the apparent optical axis 22 of the waveguide. Aberrations will increase generally as d increases, since there arises an undesired virtual optical axis as the reflection of the optical axis 36, thus perturbing the imaging properties of the lens. It is important that d be uniform along the length of HGRL 30 and that the polished surface 37 be planar. This polished planar surface 37 is then rendered highly reflective by the addition of any of a variety of metallic or dielectric thin film coatings. Light rays which intersect this reflective planar surface 37 will be reflected efficiently back towards optical axis 36 following a sinusoidal trajectory. Provided that $d<<a$, HGRL 30 will perform effectively as an unmodified SELFOC for the unperturbed remaining aperture of the lens. Specifically, a collimated light beam centered on HGRL endface 32 (approximately half the aperture of the original SELFOC) of pitch $L=0.23 P$ as shown in FIG. 1 will be focused onto input waveguide endface 26 according to the same mathematical description appropriate to the original SELFOC lens.

This disclosure is based on specific work with raised channel waveguides formed with polymeric materials, such as polyimides. Waveguide 16 thicknesses t range from a few micrometers to about 50 micrometers, and lower waveguide clad 20 has a thickness b in the range of 2-8 micrometers. Raised channel waveguides have been formed using reactive ion etch processes to delineate the channel as well a direct write processes on photosensitive polyimides. The transverse cross-section in FIG. 3 shows an apparent waveguide axis 22 a distance $b+(t/2)$ above top surface 13 of waveguide substrate 12. The reflective layer 14 on top of waveguide substrate 12 near the waveguide endface 26 is used to reflect efficiently those light rays incident on waveguide endface 26 below the apparent waveguide optical axis 22. In the absence of HGRL 30, a far-field pattern exiting waveguide endface 26 can be described approximately as an apparent Lloyd's mirror effect in that interference fringes would form along the HGRL endface for distances c sufficiently large. These fringes can be described adequately by the interference of the light emanating the real waveguide endface 26 and a virtual waveguide endface 27 shown in FIG. 3. The fringe periodicity is proportional to wavelength and the distance from the waveguide endface 26 to the observation plane (such as the input surface of the HGRL) and inversely proportional to $b+t/2$. If s is defined as the diameter of the focused beam on the waveguide endface 26 and w is defined as the distance between the bottom or flattened surface 37 of HGRL 30 and the top of the waveguide substrate 13, it can be shown that d should be chosen so that:

$$b+s/2<d+w<t+b-s/2$$

Figure 2:
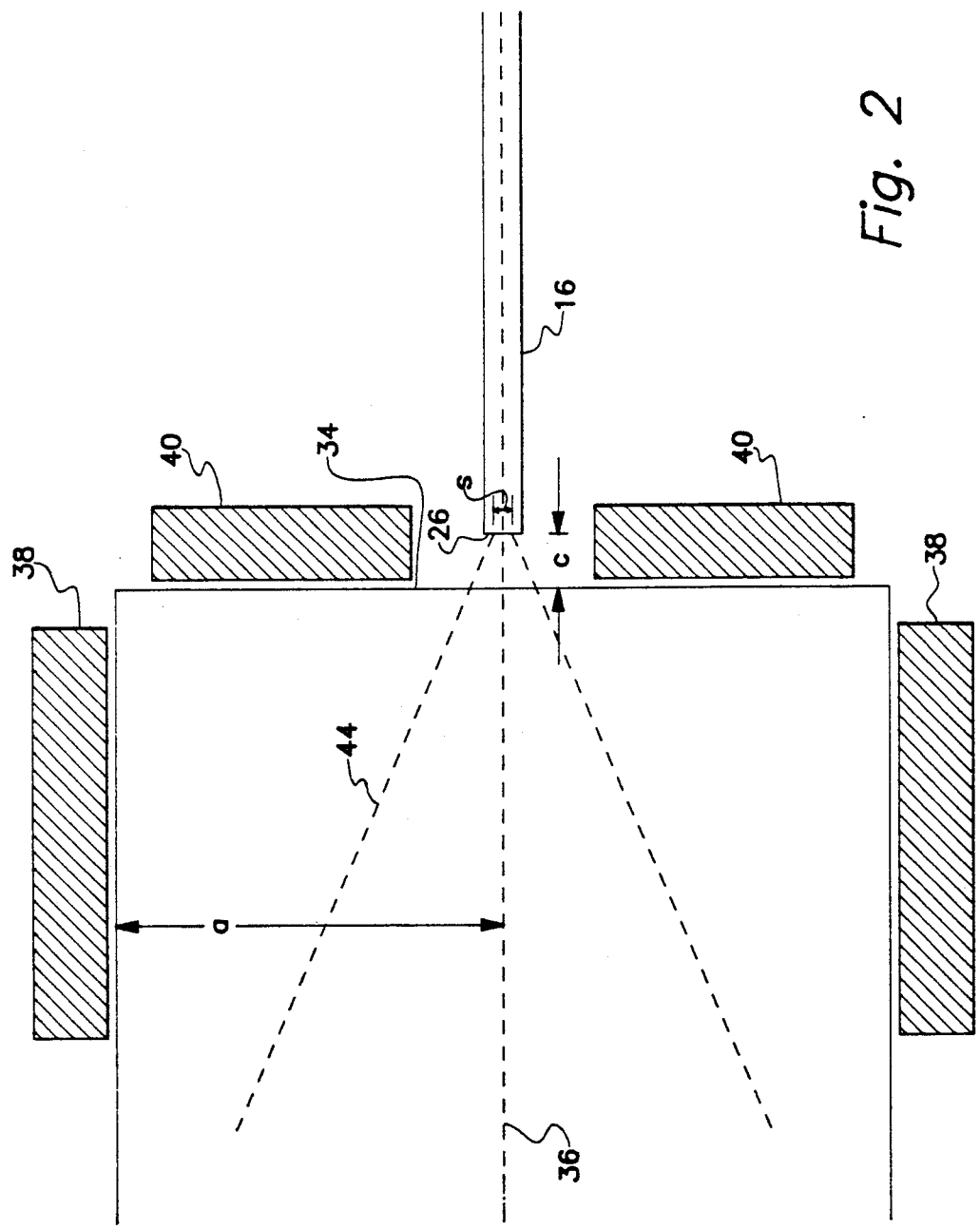
FIGS. 2 shows a plane view of device of FIG. 1 and in addition shows lateral and longitudinal alignment stops.

In either the direct write or the etched channel fabrication approach, longitudinal alignment stops 40 and lateral alignment stops 38 shown in FIG. 2 can be easily formed in the same process as delineating raised channel waveguide 16 or in sequential process steps. In either case, the registration of the alignment stops 38 and 40 to the waveguide endface 26 can be very precise as it is limited only by mask writing precision or intermask registration, respectively. The purpose of the alignment stops 38 and 40 is to precisely align HGRL 30 to the waveguide endface 26. Waveguide endface 26 is usually formed in the channel delineation step but can be formed in a separate step to give it better coupling properties. Experiments have shown that the raised channel waveguide 16 thickness typically used is sufficiently thick and sturdy to be used as well as the alignment stop mechanism; this single-step process is preferred because of fabrication simplicity. Although waveguide endface 26 of raised channel waveguide 16 must be located precisely with respect to HGRL 30, the location of endface 26 on substrate top 13 is relatively unimportant. A collimated beam centered on HGRL 30 aperture can readily propagate over raised channel waveguide 16 without beam degradation by virtue of the off-axis coupling mechanism. Although there are practical limits to the distances for collimated beam propagation used in this scheme, the principal advantage is low propagation loss. Lateral alignment stops 38 and 40 can be metallized, as can the original SELFOC, so surface tension mechanisms can be utilized in soldering the HGRL to lateral alignment stops 38 and 40, giving a sturdy self-centering coupler attachment.

Figure 4:
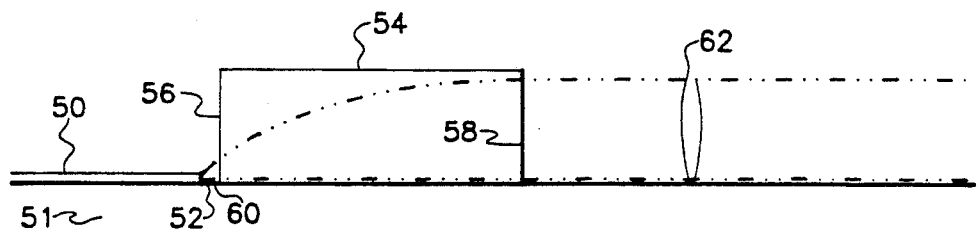
FIG. 4 shows an elevation view of an alternative embodiment of a device for coupling a raised channel waveguide to a collimated beam.

An alternate embodiment of the present invention is shown in FIG. 4 where raised channel waveguide 50 is formed on substrate 51 and has an endface 52. HGRL 54 has entering face 56 and exiting face 58. Light 60 emanating from endface 52 travels along HGRL 54 and exits at exiting face 58 as collimated light beam 62. This embodiment is merely the reciprocal process of the embodiment earlier described. The coupling is from raised channel waveguide 50 to free space beam 62, rather than from free space beam 62 to raised channel waveguide 50.

Figure 5:
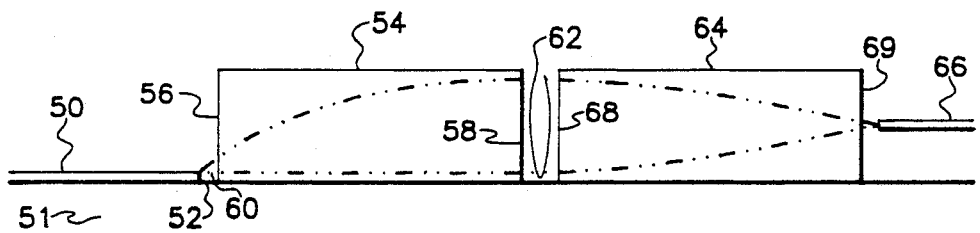
FIG. 5 shows an elevation view of an alternative embodiment of a device for coupling a raised channel waveguide to a collimated beam and then to an optical fiber.

In FIG. 5 a collimated light beam to fiber coupler is illustrated. Collimated light beam 62 is coupled to optical fiber 66 by GRIN 64. GRIN 64 has entering face 68 and exiting face 69. In this configuration HGRL 54 has a diameter twice the diameter of GRIN 64. In this arrangement on axis beam to fiber coupling is desired because of fiber buffering, stress relief and the need to accommodate the mechanical structure used to precisely align optical fiber 66 to GRIN 64.

Figure 6:
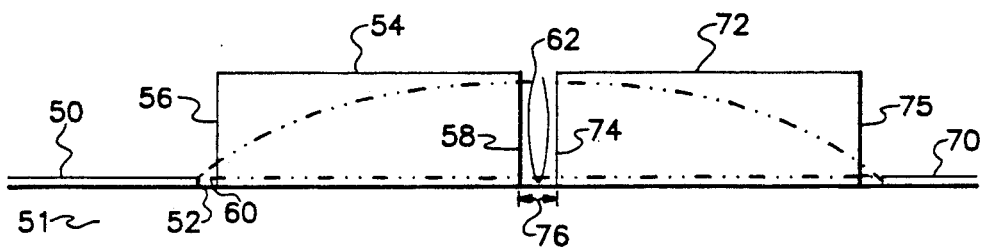
FIG. 6 shows an elevation view of an alternative embodiment of a device for coupling a raised channel waveguide to a collimated beam and then to another raised channel waveguide.

FIG. 6 illustrates coupling between raised channel waveguide 50 and raised channel waveguide 70. HGRL 72 has an entering face 74 and an exiting face 75.

Space 76 between HGRL 54 and HGRL 72 could be occupied by any of a variety of bulk microoptic elements such as filters or polarizers or the like.

Figure 7:
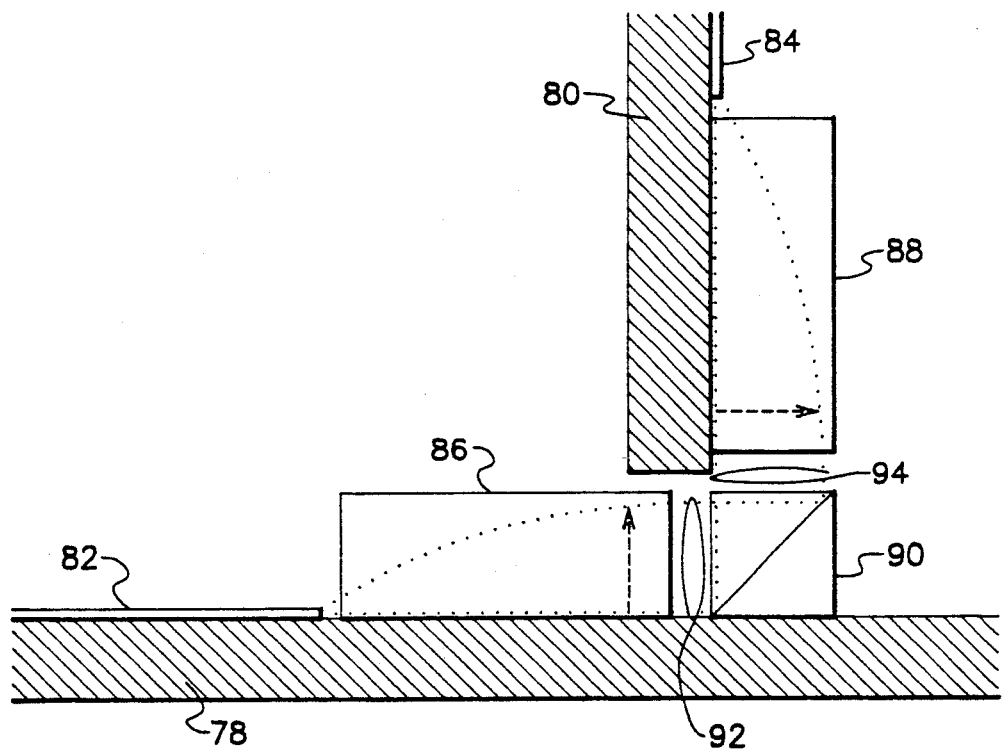
FIG. 7 shows an elevation view of an alternative embodiment of a device for coupling a raised channel waveguide to a collimated beam and then to another raised channel waveguide which is out of the plane of the first raised channel waveguide.

An important implementation of this configuration using a microoptic element is shown schematically in FIG. 7 which shows the present invention used as an optical interconnect between printed circuit boards oriented orthogonally to each other.

In FIG. 7 printed circuit board 78 is located orthogonally to printed circuit board 80. Raised channel waveguide 82 is formed on board 78 and raised channel waveguide 84 is formed on board 80. HGRL 86 is mounted on board 78 and HGRL 88 is mounted on board 80.

Waveguide 82 and HGRL 86 are arranged for waveguide to collimated beam coupling as disclosed herein.

Corner reflector 90 performs a direction change in collimated beam 92.

HGRL 88 and raised channel waveguide 84 are arranged for coupling of collimated beam 94 to raised channel waveguide 84 as disclosed herein.

Figure 8:
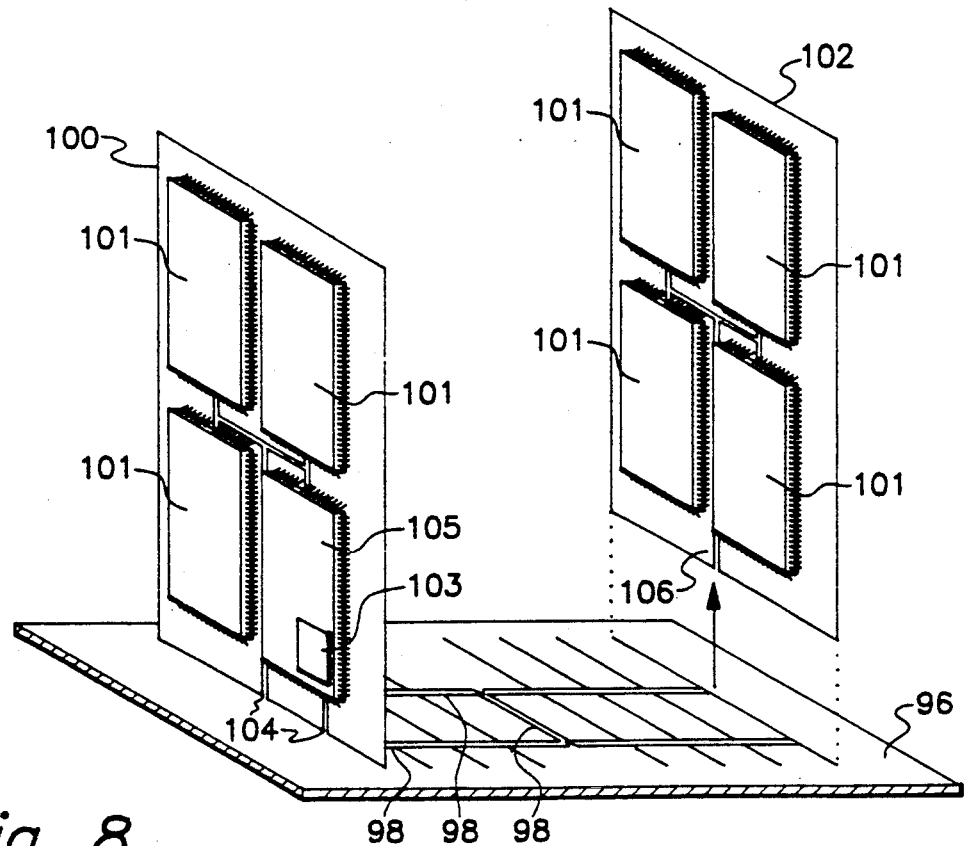
FIG. 8 shows a perspective view of a model of a device that incorporates the features illustrated in FIG. 7.

A satisfactory model of the use of the present invention for connection between printed circuit board modules and a system backplane is illustrated in FIG. 8 in accordance with the present invention.

As illustrated in FIG. 8, motherboard 96 includes raised channel waveguides 98 in an optical 8×8star configuration. Only daughter board 100 and daughter board 102 are illustrated, but connection provision is made on motherboard 96 to connect a total of eight daughter boards. Modules 101 may be mounted o each of the daughter boards. Raised channel waveguides 104 are shown on daughter board 100 and raised channel waveguide 106 is shown on daughter board 102. This arrangement allows a single controller 103 located in module 105 to communicate with all modules 101.

Figure 9:
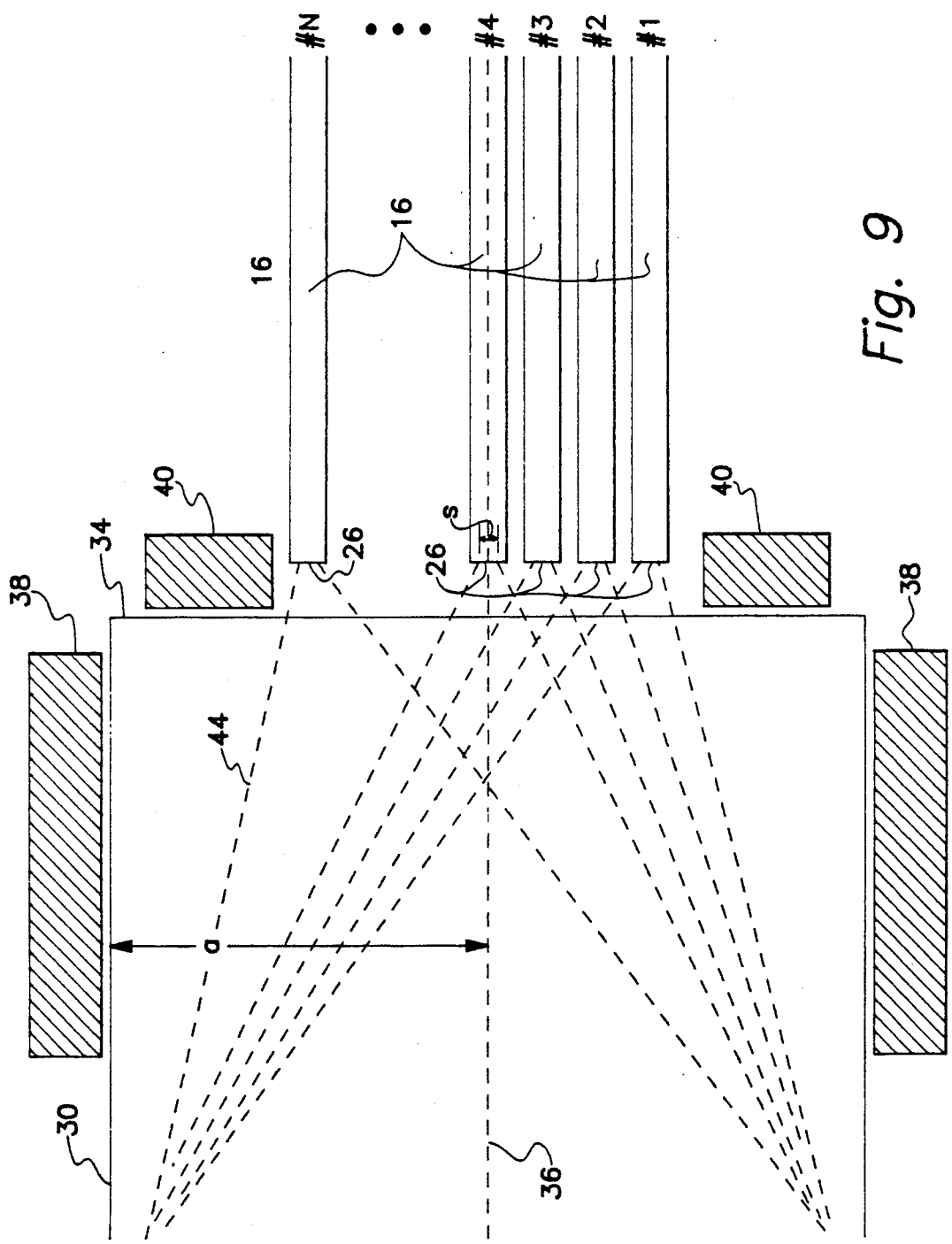
Figure 10:
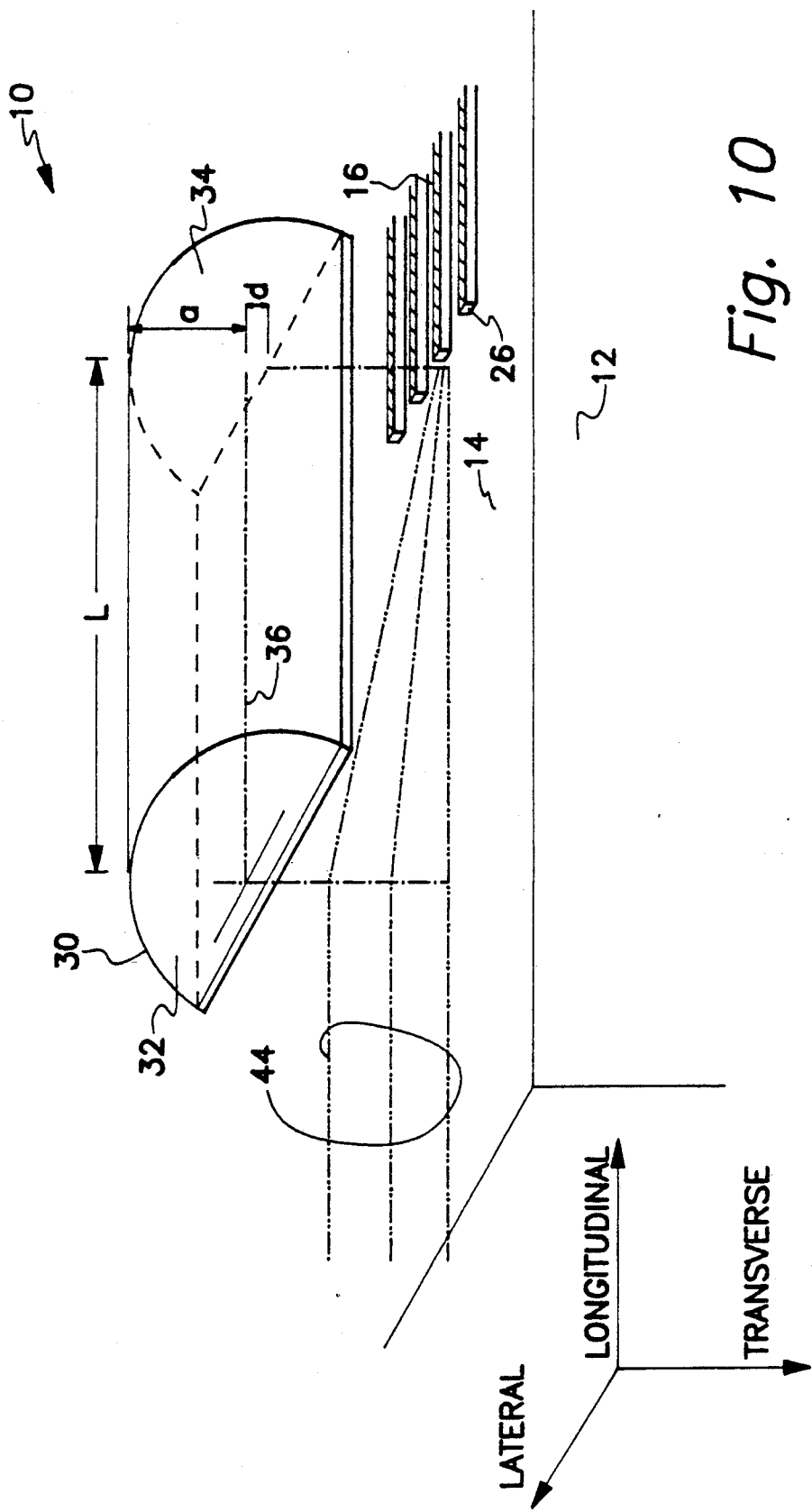

Referring now to FIGS. 9 and 10, it should be noted that a single half- cylinder graded-index rod lens (HGRL) 30 can be used to couple a plurality of raised channel surface waveguides 16 spaced laterally one next to another to free-space beams which propagate in angularly tilted directions in the transverse plane. This occurs when c is adjusted so that the waveguide endfaces 26 lie in the focal plane of HGRL 30. The lens focal plane is also called the Fourier plane because the free-space beams, which can be described adequately by simple plane waves, have an angular tilt which is proportionally given by the lateral distance of each waveguide endface 26 from HGRL 30 optical axis 36; this configuration simply gives the spatial Fourier transformation (angularly tilted plane wave decomposition) of the input light distribution (the illuminated waveguide endfaces). The lens numerical aperture, the waveguide far-field divergence, and the waveguide dimensions and spacing determine the number of raised channel waveguides 16 which can be accommodated by a single HGRL 30 coupler; applicant estimates this number to be in the range of 16–64 waveguides 16. This is very important because HGRL 30 is a relatively large structure (approximately 900 wide by 5000 micrometers long) compared to typical waveguide dimensions (8–64 micrometers) and spacings (a minimum of 8 micrometers is convenient).

Now that the construction and operation of device 10 have been set forth, many advantages can be set forth and appreciated.

Device 10 does not require machining or etching of the waveguide substrate in order to access the waveguide endface. Rather the waveguide delineation step can also be used to both prepare waveguide endface and fabricate alignment stops.

The teachings of the present invention can be used with any substrate material suitable for polymeric waveguide fabrication including many printed circuit board materials, semiconductor materials and other materials.

Laterally spaced raised channel waveguides on the same substrate surface can be coupled to be angularly tilted free space beams if waveguide endfaces lie in the focal plane of the lens, permitting a single lens to be used for many waveguide to waveguide couplers.

The cost of cylindrical rod lenses is low and the cost to modify cylindrical rod lenses in quantity can be low.

In accordance with the foregoing description, applicant has developed an optical interconnect arrangement that may be incorporated into the design of optical and electronic circuitry. Although a specific embodiment of the applicant's optical interconnect arrangement is shown and described for illustrative purposes, a number of variations and modifications will be apparent to those of ordinary skill in the relevant arts. It is not intended that coverage be limited to the disclosed embodiments, but only by the terms of the following claims.

I claim:

1. An optical interconnect device, comprising:
   a substrate having a reflective surface;
   a raised channel waveguide formed on said reflective surface of said substrate, said waveguide having an endface; and
   means for directing light traveling in a first direction in the form of a collimated light beam onto said waveguide endface and for directing light traveling in a second direction and exiting said waveguide at said waveguide endface into the form of a collimated beam, said means for directing light located on said reflective surface of said substrate adjacent to and in optical alignment with said raised channel waveguide.

2. The device of claim 1 wherein said waveguide endface is generally rectangular.

3. The device of claim 2 wherein said means for directing comprises a lens having a predetermined length, a first face, a second face, an optical axis and a flattened surface parallel to and spaced from said optical axis with said lens positioned with said flattened surface adjacent said substrate and said second face spaced from said waveguide endface so that a collimated light beam propagating parallel to said optical axis and incident on said first face will be directed onto said waveguide endface and light traveling in a second direction and exiting said waveguide at said waveguide endface and incident on said second face will be directed into a collimated beam.

4. The device of claim 3, wherein said lens is a modified graded index rod lens.

5. The device of claim 4, wherein said predetermined length is determined according to a relationship selected from:

$$L = 0.23\ P$$

or $$L = (0.23 + 0.5\ n)P$$

Where L is the predetermined length, P is the period of the sinusoidal trajectory a light ray follows in said graded index rod lens and n is any integer.

6. The device of claim 5, further comprising:
means for securing said flattened surface of said modified graded index rod lens to said substrate, said means for securing having a thickness, w.

7. The device of claim 6, wherein said means for securing is an adhesive.

8. The device of claim 7 further comprising:
means for aligning said lens on said substrate relative to said waveguide endface.

9. The device of claim 8 wherein said means for aligning comprises a lateral alignment stop and a longitudinal alignment stop.

10. The device of claim 9 wherein said raised channel waveguide has a core thickness, t, a clad thickness, b, and a focused beam on said endface has a diameter, s, with the spacing, d, of said flattened surface from said optical axis being determined according to the following relationship:

$$b + s/2 < d + w < t + b - s/2.$$

11. An optical interconnect device, comprising:
a substrate having a reflective surface;
a raised channel waveguide formed on said reflective surface of said substrate, said raised channel waveguide having an endface; and
a modified graded index rod lens having a predetermined length, a first lens face, a second lens face, an optical axis and a flattened surface parallel to and spaced from said optical axis, said modified graded index rod lens located on said reflective surface of said substrate;
said lens positioned with said flattened surface adjacent to said reflective surface of said substrate and said second lens face spaced from said waveguide endface a predetermined distance so that a collimated light beam propagating parallel to said optical axis and impinging on said first lens face will be focused onto said waveguide endface and light traveling in a second direction and exiting said waveguide at said waveguide endface and incident on said second lens face will be directed into a collimated beam.

12. The device of claim 11 wherein said predetermined length is determined according to a relationship selected from:

$$L = 0.23\ P$$

or $$L = (0.23 + 0.5\ n)P$$

Where L is the predetermined length P is the period of the sinusoidal trajectory a light ray follows in said graded index rod lens and n is any integer.

13. The device of claim 12, further comprising:
means for securing said flattened surface of said graded index rod lens to said substrate, said means for securing having a thickness, w.

14. The device of claim 13, wherein said means for securing is an adhesive.

15. The device of claim 14 further comprising:
means for aligning said lens on said substrate relative to said waveguide endface.

16. The device of claim 15 wherein said means for aligning comprises a lateral alignment stop and a horizontal alignment stop.

17. The device of claim 16 wherein said raised channel waveguide has a core thickness, t, a clad thickness, b, and a focused beam on said endface has a diameter, s, with the spacing, d, of said flattened surface from said optical axis being determined according to the following relationship:

$$b + s/2 < d + w < t + b - s/2.$$

18. An optical interconnect device, comprising:
a substrate having a reflective surface;
a plurality of raised channel waveguides formed on said reflective surface of said substrate, said raised channel waveguides each having an endface;
a modified graded index rod lens having a predetermined length, a first lens face, a second lens face, an optical axis and a flattened surface parallel to and spaced from said optical axis, said modified graded index rod lens located on the reflective surface of said substrate;
said lens positioned with said flattened surface adjacent to the reflective surface of said substrate and said second lens face spaced from said waveguide endfaces a predetermined distance so that a collimated light beam propagating parallel to said optical axis and impinging on said first lens face will be focused onto said waveguide endfaces and light traveling in a second direction and exiting said waveguides at said waveguide endfaces and incident on said second lens face will be directed into a collimated beam.

19. The device of claim 18, further comprising:
means for securing said flattened surface of said graded index rod lens to said substrate, said means for securing having a thickness, w.

20. The device of claim 19, wherein said means for securing is an adhesive.

21. The device of claim 20 further comprising:
means for aligning said lens on said substrate relative to said waveguide endfaces.

22. The device of claim 21 wherein said means for aligning comprises a lateral alignment stop and a horizontal alignment stop.

23. The device of claim 22 wherein said raised channel waveguides have a core thickness, t, a clad thickness, b, and a focused beam on said endface has a diameter, s, with the spacing, d, of said flattened surface from said optical axis being determined according to the following relationship:

$$b+s/2<d+w<t+b-s/2.$$

* * * * *